United States Patent [19]

Daniel

[11] Patent Number: 5,402,290
[45] Date of Patent: Mar. 28, 1995

[54] ONE PIECE LIMIT STOP FOR DISC DRIVE

[75] Inventor: Mathew Daniel, Oklahoma City, Okla.

[73] Assignee: Seagate Technology, Inc., Scotts Valley, Calif.

[21] Appl. No.: 77,527

[22] Filed: Jun. 14, 1993

[51] Int. Cl.⁶ .................. G11B 5/54; G11B 21/22
[52] U.S. Cl. ....................... 360/106; 360/105
[58] Field of Search ................ 360/86, 105, 106

[56] References Cited

U.S. PATENT DOCUMENTS

| | | | |
|---|---|---|---|
| 4,603,363 | 7/1986 | Rickert et al. | 360/86 |
| 4,949,206 | 8/1990 | Phillips et al. | 360/106 |
| 5,003,422 | 3/1991 | Sun et al. | 360/105 |
| 5,012,371 | 4/1991 | Pollard et al. | 360/105 |
| 5,187,627 | 2/1993 | Hickox et al. | 360/105 |
| 5,262,912 | 11/1993 | Hudson et al. | 360/105 |
| 5,262,913 | 11/1993 | Stram et al. | 360/106 |
| 5,365,389 | 11/1994 | Jabbari | 360/105 |
| 5,947,692 | 6/1990 | Okutsu | 360/105 |

FOREIGN PATENT DOCUMENTS 4149870  5/1992  Japan ................. 360/103

Primary Examiner—A. J. Heinz
Assistant Examiner—Brian E. Miller
Attorney, Agent, or Firm—Edward P. Heller, III

[57] ABSTRACT

A limit stop for defining the range of motion of a disc drive actuator. The limit stop is formed from a single piece of material. It includes a cylindrical contact surface on the distal end of a cylindrical cantilevered beam. The beam is connected to a central mounting shaft by a radially extending bridging element. The compliance of the stop is determined by the material selection and control of certain dimensions.

1 Claim, 3 Drawing Sheets

ONE PIECE LIMIT STOP FOR DISC DRIVE

BACKGROUND OF THE INVENTION

1. Field of the Invention

This invention relates generally to the field of rigid disc drive data storage devices and more particularly, but not by way of limitation, to a limit stop for defining the range of motion of the disc drive actuator.

2. Brief Description of the Prior Art

Disc drive data storage devices have found widespread use as a cost effective and convenient mechanism for the storage of large computer programs and user generated data. Those types of disc drives known as "Winchester" disc drives incorporate rigid media, and the read/write heads "fly" above the disc surface on a thin layer of air dragged along by the spinning of the discs. An actuator mechanism is included to precisely move the read/write heads from one of a large number of circular, concentric tracks to another, in order to access any data recorded on the disc surface.

Market demands for increased storage capacity and decreased access time have lead to the almost exclusive use of voice coil motors (VCMs) to drive the actuator which positions the heads, while recent trends toward smaller and smaller form factors have lead to the preeminence of rotary VCM actuators. In a typical rotary VCM actuator, an array of permanent magnets with flux-concentrating pole pieces is fixedly mounted to a housing base or base plate, with a horizontal air gap provided which is the location of a high concentration of magnetic flux. A horizontal coil mounted to a pivot housing, which turns about a vertical axis, is suspended in the magnetic field, and an array of read/write heads is cantilevered from the side of the pivot housing opposite the coil and over the stack of discs. Controlled DC power is applied to the ends of the coil, and the polarity and magnitude of the DC voltage determines the direction and speed of the movement of the heads in accordance with the well-known Lorentz relationship.

Since VCM actuators have no inherent magnetic detent when power is removed from the disc drive, such disc drives must incorporate some sort of latching mechanism to hold the heads in a stationary relationship to the discs when power is removed, in order to prevent damaging relative movement between the heads and discs while the discs are not spinning. Similarly, some device must also be included to limit the range of motion of the actuator, should a "runaway" condition occur in the electronics controlling the coil power. Since VCM actuators are subject to movement whenever a DC current is applied to the coil, any failure of the electronic circuitry supplying the coil current which causes a constant current to the coil will result in the actuator being driven to one or the other of the extremes of its range of motion, dependent on the polarity of the applied signal.

The design of a limit stop to define the extreme limit of the range of motion for a voice coil actuator involves several considerations: while the mass of the moving portion of the actuator and the maximum velocity achievable by the actuator are known quantities, a serviceable limit stop must be a compromise between total rigidity and a minimal compliance needed to prevent damage to the delicate components of the flexure assembly mounting the heads of the drive. That is, if the limit stop is too rigid, the inertia of the head can cause permanent deformation to the gimbal elements of the flexure if the actuator is brought to an instantaneous total stop. Similarly, if the limit stop is too compliant, undesirable oscillations of the heads over the surface of the disc can occur, presenting another possible mode for component damage.

Many prior art limit stops thus incorporate contact components made from rubbers or synthetic polymers. Care must be exercised in selecting such materials, however, to ensure that out-gassing does not occur, since large molecular chains can be large enough to build up on the discs or air-bearing surfaces of the heads, causing damage to these critical components. Furthermore, such soft "bumper" elements must be mounted on a rigid support member to provide the necessary stiffness to the entire assembly. Clearly such multi-part limit stops entail a number of components and some assembly, as well.

It can be seen that a need exists for a limit stop which is inexpensive to manufacture, simple to install and easily adaptable to various designs of disc drive data storage devices.

SUMMARY OF THE INVENTION

The present invention is a one-piece limit stop which can be fabricated from metal or cast from any one of a variety of plastics or other synthetic materials. The limit stop includes a cylindrical contact surface which is part of a cylindrical cantilevered beam. A central shaft, which is co-axial with the cylindrical contact surface, includes a threaded end used to mount the limit stop. Proper material selection and determination of various dimensions provides a limit stop which minimizes oscillation of the actuator when the limit stop is contacted.

It is an object of the invention to provide a unitary, or one-piece, limit stop for limiting the range of motion of a disc drive actuator.

It is another object of the invention to provide a limit stop for a disc drive which is easily adapted to various actuator designs.

It is another object of the invention to provide a limit stop for a disc drive which is inexpensive to fabricate and simple to install in the disc drive.

The operation of the invention in achieving the above objects, as well as other features and benefits of the invention, can best be understood by reviewing the following detailed description of the invention in conjunction with the accompanying drawings.

DETAILED DESCRIPTION OF THE INVENTION

Figure 1:
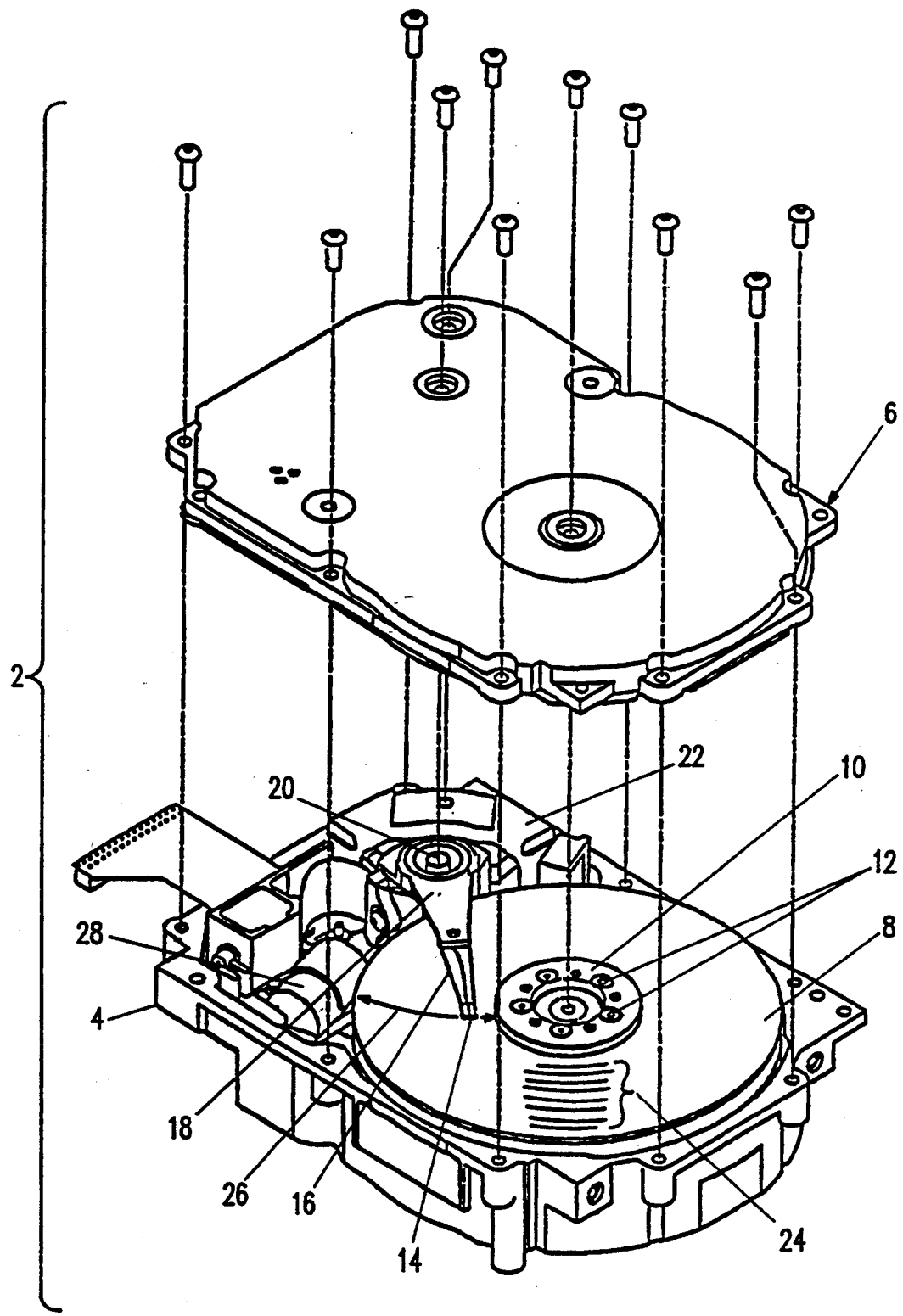
FIG. 1 is a partially exploded isometric view of a disc drive in which the invention is particularly useful.

Turning now to the drawings and more particularly to FIG. 1, shown is a partially exploded isometric view of a disc drive 2 of the type in which the present invention is particularly useful. The disc drive 2 includes a housing base 4 and a top cover 6 which cooperatively engage to form a sealed housing which serves to protect delicate internal components from external contaminants.

At least one disc 8 is mounted for rotation on a spindle motor hub (not shown) using a disc clamp 10. In this example, the disc clamp 10 is secured using screws 12 equally spaced about the perimeter of the disc clamp 10. An array of heads (one shown at 14) is mounted via flexure assemblies 16 to an actuator body 18 which is adapted for pivotal motion about a pivot shaft 20 under control of an actuator motor, shown generally at 22.

The actuator motor 22 is driven by electronic circuitry (not shown) to controllably move the heads 14 to any desired one of a plurality of concentric circular tracks 24 on the discs 8 along arcuate path 26.

The disc drive 2 is made such that, when power to the unit is removed, the heads 14 are moved to a "park" location near the inner diameter of the discs 8, and the actuator (not separately designated) is latched in this park location using a solenoid 28, in a manner which will be described below.

Figure 2:
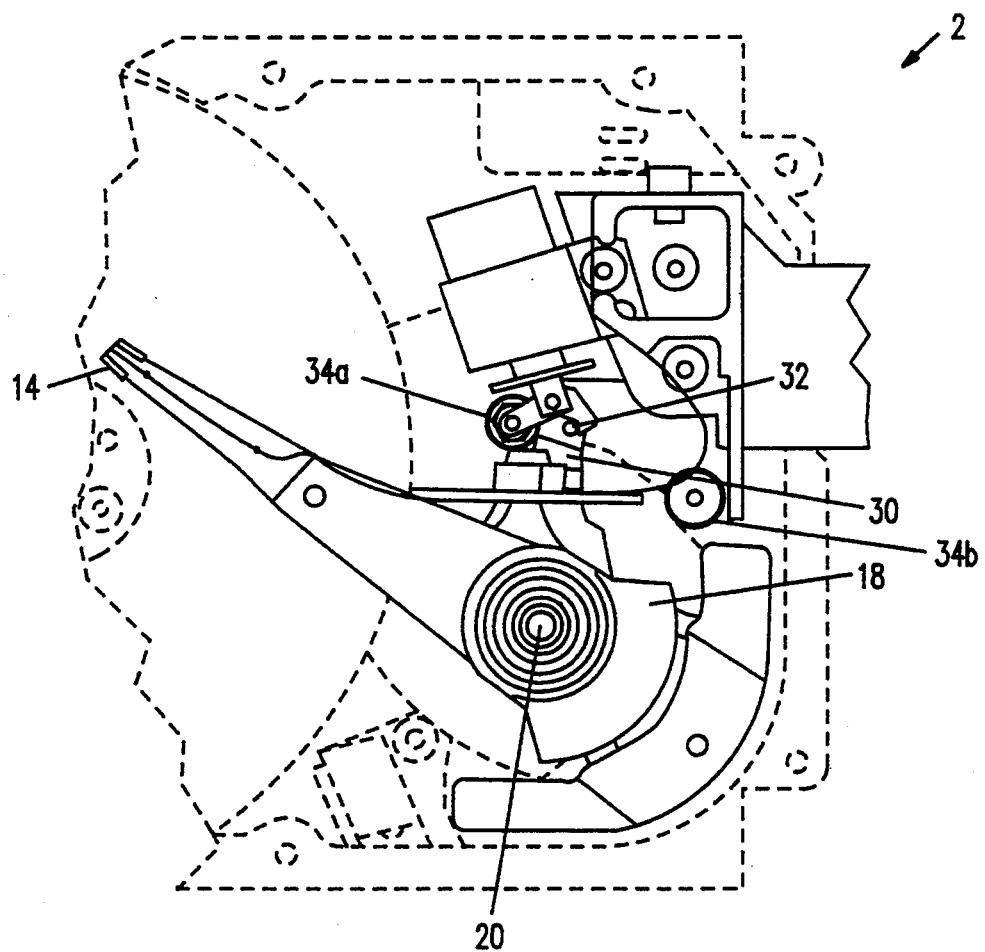
FIG. 2 is a partial plan view of the disc drive of FIG. 1 showing the relationship between the actuator and the limit stop of the present invention.

Turning now to FIG. 2, shown is a partial plan view of the interior of the disc drive 2 of FIG. 1. In this view it can be seen that the actuator body 18 includes an integral latch pin/contact arm—hereinafter referred to as a contact feature 30—which rotates about the pivot shaft 20 in concert with the actuator body 18. The contact feature 30 mounts an upwardly-extending latch pin 32, the function of which will be described below.

The figure also shows an inner limit stop 34a and an outer limit stop 34b. The range of motion of the actuator body 18—and the attached heads 14—is thus limited, in the inward direction (counter clockwise) by contact between the inner limit stop 34a and a first surface (not designated in this figure) of the contact feature 30, and in the outward direction (clockwise) by contact between the outer limit stop 34b and a second surface (also not designated here) of the contact feature 30.

Figure 3:
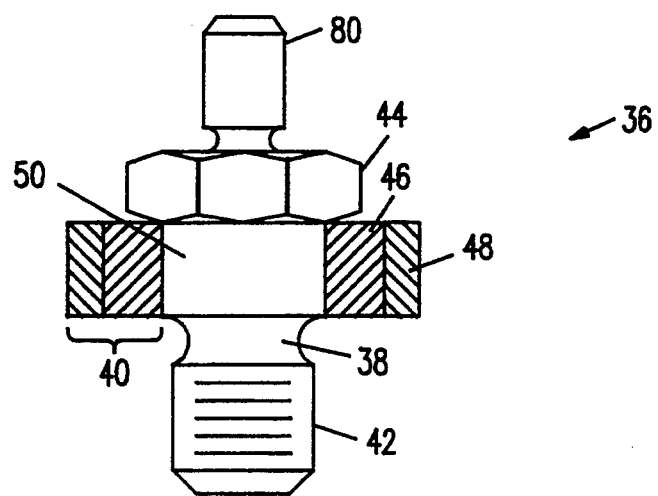
FIG. 3 is a partially sectioned elevation view of a prior art limit stop assembly.

FIG. 3 shows a prior art limit stop assembly 36 in partially-sectioned elevation view. The limit stop assembly 36 consists of a mounting shaft 38 (shown in elevation) and a bumper element 40 (shown in section). The mounting shaft 38 is fabricated from 300 series stainless steel and includes a threaded base portion 42 for mounting the limit stop assembly 36 in a tapped hole. A hex nut portion 44 above the bumper element 40 allows the use of common tools to install the assembly. The bumper element 40 is made up of two components: an inner elastomer 46 and an outer ring 48. In a known prior art embodiment, the inner elastomer 46 is a polyurethane with a shore hardness of 35, the outer ring 48 is 300 series stainless steel, and the inner elastomer 46 is molded in the outer ring 48. The complete bumper element 40 is assembled to the mounting shaft 38 by sliding the bumper element 40 over the threaded base portion 42 of the mounting shaft 38 and into engagement with a central sleeve portion 50 of the mounting shaft 38. In this prior art limit stop 36, the moving contact feature (30 in FIG. 2) is intended to contact the outer surface of the outer ring 48, and the desired resilience is provided by deformation of the inner elastomer 46. It will be appreciated by those skilled in the art that such a limit stop assembly is fairly complex to fabricate and therefore rather expensive as well.

Figure 4:
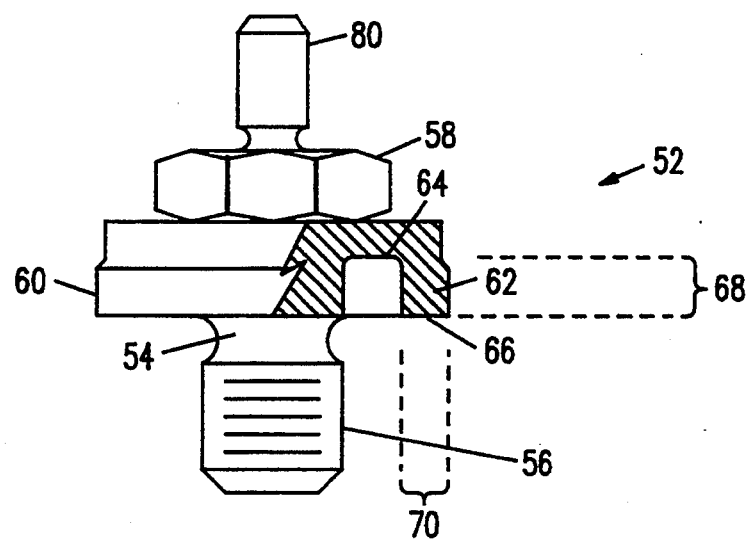
FIG. 4 is a partially cut-away elevation view of the limit stop of the present invention.

FIG. 4 shows the limit stop 52 of the present invention in a partially cutaway elevation view. The limit stop 52 includes a central shaft 54 with a threaded end portion 56 and hex nut portion 58 as did the prior art limit stop assembly of FIG. 3. A cylindrical contact surface 60 forms the outermost surface of a cylindrical cantilevered beam 62 which is in turn connected to the central shaft 54 by a radially extending bridging element 64. It is apparent from the figure that the limit stop 52 is fabricated from a single piece of material, thus reducing the parts count, complexity and, therefore the expense of the limit stop. The desired resilience is achieved in the limit stop 52 because the contact surface 60 is closely adjacent the distal end 66 of the cantilevered beam 62. The amount of resilience is determined by properly selecting the length 68 and thickness 70 of the cantilevered beam 62, i.e., the stiffness of the limit stop 52 can be increased by reducing the length 68 or increasing the thickness 70 of the cantilevered beam 62, and the stiffness of the limit stop 52 can be decreased by increasing the length 68 or decreasing the thickness 70. It should be noted that changes in the length 68 and thickness 70 of the cantilevered beam 62 can be made which change the dimensions without altering the stiffness of the entire structure. For instance, if the cantilevered beam 62 were to be lengthened by a known amount, it would be possible to maintain the same stiffness by increasing the thickness 70, and vice versa.

Through the exercise of proper engineering practices, it is possible to design a limit stop made in compliance with the present invention for various designs of disc drives. For instance, knowing the mass of the moving portion of the actuator, the maximum velocity which the actuator can achieve and the characteristics of the material chosen for the limit stop, the limit stop can be designed to minimize the amount of relative motion between the heads and discs when the contact feature of the actuator contacts the limit stop. That is, when the contact feature of the actuator meets the limit stop, the limit stop will deflect through a single excursion from its nominal configuration, to a maximum deformation, and back to its nominal configuration.

Figure 5:
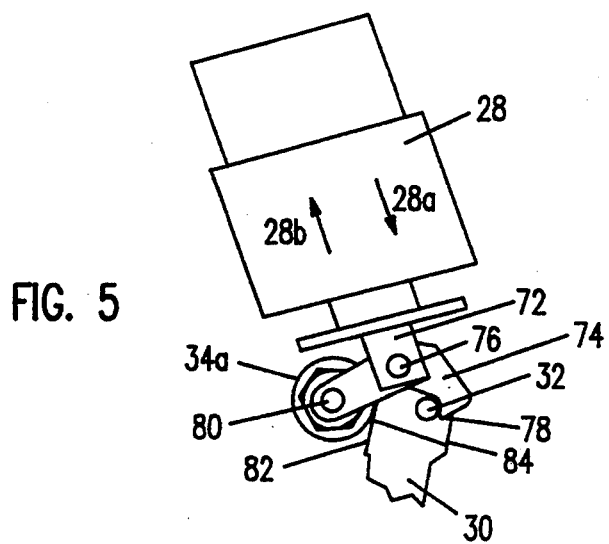
FIG. 5 is a detail view of a portion of the plan view of FIG. 2 showing the relationship between the limit stop of the present invention and a latching mechanism.

The utilization of the limit stop of the present invention in conjunction with a latching mechanism for holding the actuator in a parked position can be seen in FIG. 5, which shows the inner limit stop 34a and a latch mechanism. The latch mechanism consists of a solenoid 28 which includes a plunger 72, which is spring biased in the direction of arrow 28a when no power is being applied to the solenoid 28, and is pulled in the direction of arrow 28b when dc current is correctly applied to the solenoid 28. The distal end of the plunger 72 includes a hole (not designated). A latch pawl 74 is pivotably mounted to the plunger 72 with a pivot pin 76. The latch pawl 74 has a striker surface 78 at one end and an opening (not designated) at the other end.

Turning back to FIGS. 3 and 4, it will be noted that both the prior art limit stop assembly 36 and the limit stop 52 of the present invention incorporate a top pin 80, which is a cylindrical portion co-axial with the remainder of the limit stop assembly 36 and limit stop 52. This top pin 80 aids in the handling of the limit stop during installation and further acts as a hinge pin for the latching mechanism of FIG. 5.

Returning now to FIG. 5, it can be seen that this top pin extends upward through the opening in the end of the latch pawl 74. The operation of the latching mechanism is as follows:

1) when the contact feature 30 carried by the actuator body (18 in FIGS. 1 and 2) is moved by the actuator to its innermost position, the latch pin 32 contacts the striker surface 78 on the latch pawl. Since the striker surface 78 lies at an angle to the path of the latch pin 32, the latch pin 32 forces the latch pawl 74 to rotate counterclockwise about the top pin 80. This action overcomes the bias spring (not shown) in the solenoid 28 and forces the plunger 72 into motion in the direction of arrow 28b.

2) as the latch pin 32 moves past the tip of the striker surface 78 of the latch pawl 74, the bias spring in the solenoid 28 forces the latch pawl 74 to rotate clockwise back to its original position.

3) when the contact feature 30 has moved to a point where the latch pawl is moving back clockwise, an inner stop surface 82 on the contact feature 30 contacts the inner limit stop 34a. Thus the contact feature 30—with the attached actuator body (18 in FIGS. 1 and 2) and associated heads (14 in FIGS. 1 and 2)—is captured between the latch pawl 74 and the inner limit stop 34a.

To release the actuator for operation, a dc current pulse is applied to the solenoid 28 and the plunger is moved in the direction of arrow 28b, pivoting the latch pawl 74 about the top pin 80 of the inner limit stop 34a. The actuator is then free to move the latch pin 32 out of the latching position and into its operational range of motion.

FIG. 5 also shows that the contact feature 30 also includes an outer stop surface 84, opposite the inner stop surface 82, which is situated to engage the outer contact surface (60 in FIG. 4) of the outer limit stop (34b in FIGS. 1 and 2).

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A limit stop for limiting the range of motion of an actuator in a disc drive, the actuator including a moving portion which further includes a contact feature for contacting the limit stop, the limit stop comprising one continuous piece of material forming:
 a central shaft, the central shaft including mounting means for attaching the limit stop within the disc drive;
 a substantially non-compliant bridging portion encircling the central shaft and extending radially therefrom;
 a cylindrical compliance portion forming a continuous cantilever beam, the cylindrical compliance portion having a first proximal end integral to the outer extent of the bridging portion and a second distal end, the cylindrical compliance portion being coaxial with the central shaft and extending axially from the outer extreme of the bridging portion; and
 the outer surface of the distal end of the cylindrical compliance portion forming a cylindrical contact surface for engagement with the contact feature of the actuator, the cylindrical contact surface being coaxial with the central shaft and the cylindrical compliance portion.

* * * * *